(12) United States Patent
Hofschulte et al.

(10) Patent No.: US 10,906,517 B2
(45) Date of Patent: Feb. 2, 2021

(54) PLANETARY GEAR ARRANGEMENT PARTICULARLY FOR AN ELECTROMECHANICAL SERVICE BRAKE OR AN ELECTROMECHANICAL PARKING BRAKE FOR A MOTOR VEHICLE

(71) Applicants: IMS Gear SE & Co. KGaA, Donaueschingen (DE); Continental Teves AG & Co. oHG, Frankfurt am Main (DE)

(72) Inventors: Wolfram Hofschulte, Bonndorf (DE); Wilfried Synovzik, Hüfingen (DE); Johannes Stöhr, Weilersbach (DE); Johann Jungbecker, Badenheim (DE); Paul Linhoff, Neu-Anspach (DE); Jürgen Böhm, Oberneisen (DE)

(73) Assignees: IMS Gear SE & Co. KGaA, Donaueschingen (DE); Continental Teves AG & Co. oHG, Frankfurt am Main (DE)

( * ) Notice: Subject to any disclaimer, the term of this patent is extended or adjusted under 35 U.S.C. 154(b) by 309 days.

(21) Appl. No.: 16/002,691

(22) Filed: Jun. 7, 2018

(65) Prior Publication Data

US 2018/0354481 A1     Dec. 13, 2018

(30) Foreign Application Priority Data

Jun. 8, 2017   (EP) .................................... 17174885

(51) Int. Cl.
*B60T 11/04* (2006.01)
*F16D 65/18* (2006.01)
(Continued)

(52) U.S. Cl.
CPC ............. *B60T 11/04* (2013.01); *B60T 13/741* (2013.01); *B60T 13/746* (2013.01); *F16D 65/18* (2013.01);
(Continued)

(58) Field of Classification Search
CPC ...... B60T 11/04; B60T 13/741; B60T 13/746; F16D 65/18; F16D 2125/50;
(Continued)

(56) References Cited

U.S. PATENT DOCUMENTS 5,949,168 A * 9/1999 Dieckmann ........... B60T 13/741
188/171
6,138,801 A * 10/2000 Shirai ..................... B60T 13/74
188/157
(Continued)

FOREIGN PATENT DOCUMENTS

CN        101273212       9/2008
DE         19652230       6/1998
(Continued)

OTHER PUBLICATIONS

Korean Intellectual Property Office, "Notification of Reason for Refusal," and English translation thereof, issued in Korean Patent Application No. 10-0218-0066401, document of 18 pages, dated Jun. 14, 2019.
(Continued)

*Primary Examiner* — Frederick M Brushaber
(74) *Attorney, Agent, or Firm* — Akerman LLP; Peter A. Chiabotti (57) ABSTRACT

A planetary gear assembly, in particular for an electromechanical service or parking brake for a motor vehicle. The planetary gear assembly can include a central sun gear, a plurality of planetary gears rotatably mounted on a planetary carrier, and a ring gear enclosing the planetary gears. The
(Continued)

planetary gears can be mounted by the planetary carrier, such that the planetary gears roll off both the sun gear and the ring gear, whereby the sun gear, the planetary carrier or the ring gear is non-rotatably held by a holding unit with a holding torque. A force-sensing device can be arranged between the holding unit and the non-rotatably held element, or between the holding unit and an intermediate component non-rotatably connected to the held component. The force-sensing device can measure the force acting between the held component and the holding unit as a result of the holding torque.

14 Claims, 3 Drawing Sheets

(51) Int. Cl.
| | | |
|---|---|---|
| *B60T 13/74* | (2006.01) | |
| *F16H 1/28* | (2006.01) | |
| *F16D 66/00* | (2006.01) | |
| *F16H 25/20* | (2006.01) | |
| *F16H 1/32* | (2006.01) | |
| *F16D 125/50* | (2012.01) | |
| *F16D 121/24* | (2012.01) | |

(52) U.S. Cl.
CPC ......... *F16H 1/28* (2013.01); *F16D 2066/005* (2013.01); *F16D 2121/24* (2013.01); *F16D 2125/50* (2013.01); *F16H 2025/2087* (2013.01)

(58) Field of Classification Search
CPC ........... F16D 2121/24; F16D 2066/005; F16D 65/14; F16D 66/00; F16H 1/28; F16H 2025/2087; F16H 1/32; F16H 63/345; F16H 63/3466; F16H 2001/327
See application file for complete search history.

(56) References Cited

U.S. PATENT DOCUMENTS

| | | | | |
|---|---|---|---|---|
| 6,230,854 | B1 | 5/2001 | Schwarz et al. | |
| 6,412,610 | B1 * | 7/2002 | Drennen | F16D 55/227 |
| | | | | 188/156 |
| 7,434,669 | B2 * | 10/2008 | Halasy-Wimmer | F16D 65/18 |
| | | | | 188/158 |
| 7,677,367 | B2 * | 3/2010 | Usui | F16D 65/18 |
| | | | | 188/156 |
| 8,002,090 | B2 * | 8/2011 | Yasukawa | F16D 65/0006 |
| | | | | 188/158 |
| 8,047,339 | B2 * | 11/2011 | Park | F16D 65/18 |
| | | | | 188/72.8 |
| 8,448,757 | B2 * | 5/2013 | Vollert | F16D 65/18 |
| | | | | 188/156 |
| 9,080,623 | B2 * | 7/2015 | No | F16D 65/18 |
| 9,145,939 | B2 * | 9/2015 | Giering | F16D 65/18 |
| 9,518,622 | B2 * | 12/2016 | Vogel | B60L 7/28 |
| 10,479,443 | B2 * | 11/2019 | Lis | B62M 6/80 |
| 2004/0163900 | A1 | 8/2004 | Beuerle et al. | |
| 2005/0247258 | A1 | 11/2005 | Schack et al. | |
| 2012/0298455 | A1 | 11/2012 | Bachon et al. | |
| 2013/0186717 | A1 * | 7/2013 | Muramatsu | B60T 1/005 |
| | | | | 188/72.1 |
| 2014/0329640 | A1 * | 11/2014 | Helmer | B60K 6/387 |
| | | | | 477/5 |
| 2015/0122606 | A1 * | 5/2015 | Vogel | B60K 6/387 |
| | | | | 192/20 |
| 2018/0154981 | A1 * | 6/2018 | Lis | B62M 11/145 |

FOREIGN PATENT DOCUMENTS

| | | |
|---|---|---|
| DE | 102011002565 | 8/2011 |
| EP | 2767812 | 8/2014 |
| EP | 3124345 | 1/2017 |
| KR | 20120096776 | 8/2012 |
| KR | 101363558 | 2/2014 |
| KR | 20140014713 | 2/2014 |
| WO | 2004013513 | 2/2004 |

OTHER PUBLICATIONS

European Patent Office, "European Search Report" issued in European Patent Application No. 17174885.8, German Searching Authority, document of 9 pages, dated Dec. 13, 2017.

* cited by examiner

PLANETARY GEAR ARRANGEMENT PARTICULARLY FOR AN ELECTROMECHANICAL SERVICE BRAKE OR AN ELECTROMECHANICAL PARKING BRAKE FOR A MOTOR VEHICLE

CROSS-REFERENCE TO RELATED APPLICATIONS

This application claims priority to European Patent Application No. 17 174 885.8, filed Jun. 8, 2017, which is incorporated by reference in its entirety.

BACKGROUND

The present application relates to a planetary gear assembly, particularly for an electromechanical service brake or an electromechanical parking brake for a motor vehicle.

SUMMARY

At the priority date of the present application, service brakes of motor vehicles are operated almost exclusively by means of hydraulic systems. In contrast, parking brakes, also called emergency brakes, are operated mainly electromechanically, thus achieving a number of advantages: Conventional parking brakes, also called hand brakes, are operated manually by means of a cable and a handle. The handle is usually arranged in the center console of the motor vehicle and must be freely accessible in order to operate. The handle takes up a corresponding amount of space, thus imposing certain restrictions on the design of the interior of a motor vehicle. In contrast, a relatively small switch is all that is needed to actuate an electromechanical parking brake, and it does not have to be positioned in the center console, which means far fewer restrictions on the interior design.

Moreover, when approaching slopes, a certain amount of practice is required to operate the handle, in order for the motor vehicle not to roll backward and also avoid choking the engine, if the conventional parking brake is released too late. Conversely, an electromechanical parking brake can be controlled by a control unit, which releases the electromechanical parking brake at the right moment without the need for the driver to actively intervene. Thus, the electromechanical parking brake may be used as traction aid. Moreover, the electromechanical parking brake can be integrated into a safety system by using a control unit, which automatically immobilizes the motor vehicle upon standstill as a result of autonomously triggered braking due to a hazardous situation, and prevents it from rolling away in an uncontrolled fashion. This may be important, if the driver is unconscious or unable to operate the parking brake due to injuries sustained.

Immobilization and braking differ in that when decelerating the motor vehicle, the speed needs to be reduced, whereas immobilizing the motor vehicle means that it is at a standstill and acceleration needs to be prevented. Unless otherwise stated, the following explanations apply equally to deceleration and immobilization.

As with electromechanical parking brakes, electromechanical service brakes also have a number of advantages over conventional hydraulically actuated service brakes. The mere fact that a hydraulic system is no longer needed means that operational safety can be improved, as the risk of service brake failure due to defective or porous brake hoses in electromechanical brakes is no longer present. Hydraulic fluid is usually harmful to the environment, so even this type of problem is also removed. Furthermore, the hydraulic system takes up space, which can be saved, when using an electromechanical service brake. Although conventional service brakes may be integrated into a safety system in order to prevent, e.g., blockage of the wheels during emergency braking (antilock braking system), actuators, which release and reduce the brake pressure in the corresponding section of the hydraulic system, are still needed here. These actuators can be omitted in an electromechanical service brake. In addition, integration into a safety system with an electromechanical service brake is simpler and more scalable.

However, electromechanical service brakes have the following disadvantage: The known electromechanical service brakes have an electronic drive unit, which interacts with a planetary gear. On the output side of the planetary gear, a brake unit is arranged, which comprises a friction lining acting on a brake disc. Both the friction lining and the brake disc may wear differently during operation of the motor vehicle. This wear is insignificant in conventional, hydraulically actuated service brakes, in that the direct connection of the hydraulic system with the brake unit ensures that with a certain brake pressure a corresponding braking force is always applied to the brake disc. This feedback does not occur in electromechanical service brakes. If, therefore, a controlled variable of a certain value is acting on the electronic drive unit, it is impossible to make a determination as to the braking force actually being applied to the brake disc. Since a motor vehicle usually has four decelerated wheels, it is not uncommon for the brake disc and the friction lining to wear differently on each wheel. In this case, the wheels are decelerated to different degrees, when a controlled variable of the same value is acting on the electronic drive unit, which can lead to yawing moments and thus uncontrolled movements of the motor vehicle during braking. Due to the lack of information about the "actual value" of the actually acting braking force, it is impossible to integrate electromechanical service brakes into a control loop.

In order to remove this disadvantage, U.S. Pat. No. 6,412,610 B1, DE 196 52 230 A1 and DE 10 2011 002 565 A1 propose to integrate a force-sensing device for measuring the force acting on the brake disc into the electromechanical service brake, thus making it possible to perform a setpoint/actual value comparison of the braking force and allowing for an electromechanical service brake to be integrated into a control loop. In all of the above cases, a force acting along the axis of rotation of the planetary gear is measured.

However, a disadvantage of these electromechanical service brakes is their relatively complex and space-consuming design, which has meant that they have become popular only in certain vehicles.

These disadvantages of the electromechanical service brakes also apply to parking brakes, which mostly have a design identical to that of service brakes. To ensure against a motor vehicle rolling away, even when it is parked on a slope, the brake disc requires the application of a certain braking force. If the electronic drive unit is acted upon by a certain controlled variable determining the braking force to be applied on the brake disc, this braking force may be sufficient to safely immobilize the motor vehicle. However, the braking force may change over time. This may be the case, e.g., when the parking brake is activated, when the brake disc is very hot and the brake disc subsequently cools down. Consequently, even with parking brakes, it is not possible to comment on which braking force is actually applied to the brake disc.

The object of an embodiment of the present application is to provide an electromechanical service brake and an electromechanical parking brake, with which the aforementioned disadvantages can be effectively removed. In particular, the electromechanical service brake and the electromechanical parking brake should have a simple and space-saving design, and be easily manufactured.

This object is achieved with the features and structures recited herein. The present disclosure provides further advantageous embodiments herein.

An embodiment of the present application relates to a planetary gear assembly, in particular for an electromechanical service brake or an electromechanical parking brake for a motor vehicle, comprising a central sun gear, a number of planetary gears, which are rotatably mounted on a planetary carrier, and a ring gear enclosing the planetary gears, wherein the planetary gears are mounted by means of the planetary carrier, such that they may roll off both the sun gear and the ring gear, wherein either the sun gear, the planetary carrier or the ring gear is non-rotatably held by a holding unit with a holding torque, and wherein between the holding unit and the non-rotatably held element, or between the holding unit and an intermediate component non-rotatably connected to the held component, a force measuring means is arranged for measuring the force acting between the held component and the holding unit as a result of the holding torque, whereby the acting force has a fixed relation to the transferred torque.

The "rotationally held element" refers to the element of the group, which is formed by the sun gear, the planetary carrier and the ring gear, which is non-rotatably held by means of the holding unit. Depending on the structural design, the holding unit does not interact directly with the non-rotatably held element, instead an intermediate component may have to be provided, e.g., a bearing pin and/or a shaft, with which a torque can be transmitted from the non-rotatably held element to the holding unit.

A planetary gear assembly refers to a gear assembly, which comprises a planetary gear, often also called a planetary gear, whose structure is well known and need not be described in more detail here. In order for a planetary gear to change speed and torque relative to the drive and the output, either the sun gear, the planetary carrier or the ring gear must be held securely and the drive and the output occur via the non-held component. Torque, which is needed for securing the non-rotatably held element, can be applied by the holding unit, also referred to as the holding torque, and increases along with the torque transferred by the output shaft. As for an electromechanical service brake or an electromechanical parking brake, the transferred torque is determined by the braking force acting on the brake disc. This makes it possible to comment on the required holding torque in terms of the acting braking force. The holding torque is determined by arranging a force-sensing device between the held component and the holding unit in order to measure the force acting between the held element and the holding unit. Based on the force acting between the held element and the holding unit, the holding torque and the acting braking force can be determined by a simple conversion. In order for the force-sensing device to measure the force acting between the held component and the holding unit, the held component and the holding unit must overlap both radially and axially in an overlapping section.

The proposed arrangement of the force-sensing device requires only very minor structural changes. In addition, from a production-engineering standpoint, the force-sensing device may be arranged in a particularly favorable location, thereby allowing for easy manufacture of the present planetary gear assembly. The force-sensing device may, e.g., be arranged free installation space is available, or where it can be securely mounted. The manufacture of the present planetary gear assembly may be simplified considerably over known electromechanical service brakes and parking brakes.

According to a further embodiment, the force-sensing device has a force transducer. Force transducers are available in a variety of designs allowing for the use of an appropriate design for the application. Moreover, force transducers are used in various fields of application, i.e., they are reliable and a lot of experience in dealing with them is available. These advantages simplify the design, manufacture and operation of the proposed planetary gear assembly.

In a further development of the embodiment, the force transducer may be implemented as a spring body force transducer. On account of the force effect, the spring body of the force transducer is elastically deformed. The force absorption must be in the specified direction. The deformation of the spring body metal is converted into a change of electrical voltage by using strain gauges, whose electrical resistance varies with the strain. A measuring amplifier detects the electrical voltage and thus the change in strain. This can be converted due to the elastic properties of the metal into a force reading, whereby the force transducer is calibrated.

Spring body force transducers are characterized by a particular robustness and low susceptibility to interference. They may include, e.g., flexure beams, ring-torsion springs, S-shaped spring bodies, expansion cylinders, or diaphragm spring bodies. Thus, various designs are available, allowing for optimal selection for the relevant field of application. Selection criteria may include the preferred stress in tension or compression, the acting forces and the required accuracy.

In a further embodiment, the force-sensing device may comprise a number of piezo-force transducers. Piezoelectric force transducers may be designed as very rigid and, in particular, to measure highly dynamic forces, which, depending on the design, may be as high as 60 kHz.

In a further embodiment, the force-sensing device may include a number of electromagnetic compensation transducers. This type of force transducers is particularly appropriate, when minute forces need to be measured with precision.

A further development of the embodiment is wherein the force-sensing device comprises a number of magnetostrictive elements. Magnetostriction means the deformation of magnetic, and in particular, ferromagnetic materials, due to an applied magnetic field. As a result, the body undergoes an elastic change in length at a constant volume. This type of force transducers is particularly appropriate, when minute forces need to be measured with precision.

A further development of the embodiment is wherein the planetary gear assembly comprises a housing, and the holding unit is formed by the housing. In any case, planetary gear assemblies typically include a housing, which may be conveniently used as a holding unit. No additional component is needed in order to equip the proposed planetary gear assembly with a holding unit, thus keeping the structure simple and the installation easy.

An embodiment of the present application relates to an electromechanical service brake for a motor vehicle, comprising an electronic drive unit, a planetary gear assembly according to one of the previous embodiments, which is drivable by means of the drive unit, wherein the force-sensing device for measuring the force acting between the held element and the holding unit generates a corresponding force value signal, and a brake unit for decelerating the motor vehicle, which brake unit may be actuated by means of the drive unit, while using the planetary gear assembly.

An embodiment of the present application relates to an electromechanical parking brake for a motor vehicle, comprising an electronic drive unit, a planetary gear assembly according to one of the previous embodiments, which is drivable by means of the drive unit, wherein the force-sensing device for measuring the force acting between the held element and the holding unit generates a corresponding force value signal, and a brake unit for immobilizing the motor vehicle, which brake unit may be actuated by means of the drive unit, while using the planetary gear assembly.

The electronic drive unit may include an electric motor, whose output torque is adjustable.

The brake unit usually comprises a brake disc, which is non-rotatably connected to a wheel of the motor vehicle. In addition, the brake unit comprises a pair of friction linings, which, when adjusted axially, act more or less strongly on the brake disc, and thus apply a braking force to the brake disc. In addition, the brake unit has a conversion device, with which the rotational movement of the output shaft of the planetary gear assembly may be converted into a translational movement so as to axially adjust the friction linings. The conversion device may comprise a threaded spindle. In a motor vehicle, several brake units, usually four, are typically installed, and may be controlled individually and independently of one another by the control unit.

An embodiment of the present disclosure relates to a motor vehicle with an electromechanical service brake according to the above-mentioned embodiment and/or an electromechanical parking brake according to the above-described design. According to the disclosure, the service brakes and the parking brakes may be activated by the same drive unit, thereby reducing the number of components in the motor vehicle. As a result, installation space is saved. Moreover, the probability of failure decreases with the number of installed parts.

In a further embodiment, the motor vehicle comprises a setpoint generator for presetting a setpoint for the braking force, with which the braking unit should brake the motor vehicle, whereby the setpoint generator generates a corresponding setpoint signal, and a control unit, which receives the force value signal and the setpoint signal, calculates the actual value of the braking force acting in the brake unit based on the force value signal and compares it with the setpoint and controls the electronic drive unit according to the result of the comparison.

As for the service brake, the setpoint generator may be the brake pedal of the motor vehicle or, in particular, in the case of the parking brake, the control unit itself, which prescribes a desired value for the braking force based on the vehicle status data supplied by corresponding sensors. Such sensors can measure, e.g., the rotational speed of the wheels, the yaw moment of the motor vehicle, or the wheel slippage of the motor vehicle. The control unit can calculate a braking force for each brake unit based on these data in order to stabilize the vehicle status.

An embodiment of the present disclosure relates to a method for operating an electromechanical service brake and/or an electromechanical parking brake for a motor vehicle, wherein the electromechanical service brake comprises an electronic drive unit, a planetary gear assembly according to one of the previously discussed embodiments, which is drivable by the drive unit, a brake unit for decelerating the motor vehicle, which brake unit may be actuated by means of the drive unit by using the planetary gear assembly, and the motor vehicle has a setpoint generator, with which a setpoint can be preset for the braking force, with which the brake unit should decelerate the motor vehicle, and a control unit, wherein the method comprises the following steps:

Generating a setpoint signal corresponding to the setpoint by using the setpoint generator;

Receiving the setpoint signal by means of the control unit;

Generating a force value signal corresponding to the force acting between the held element and the holding unit by using the force-sensing device;

Receiving the force value signal and calculating the actual value of the brake force acting in the brake unit by using the control unit;

Comparing the actual value with the setpoint value by means of the control unit, and Actuating the electronic drive unit depending on the result of the comparison by means of the control unit.

The technical effects and advantages that can be achieved with the present electromechanical service brake, the present electromechanical parking brake, the motor vehicle according to the present disclosure, as well as the methods according to the application are consistent with those that were discussed for the present planetary gear assembly. In summary, it should be noted that the proposed arrangement of the force-sensing device requires very little in the way of structural changes. In addition, from a production-engineering standpoint, the force-sensing device may be arranged in a particularly favorable location, thus making the present planetary gear assembly easy to manufacture. The force-sensing device may, e.g., be arranged where free installation space is available or where it can be securely mounted. The manufacture of the present planetary gear assembly can be substantially simplified as compared with known electromechanical service brakes. Based on the force acting between the held element and the holding unit, the force acting in the brake unit can be derived by a relatively simple conversion, such that the computational cost for the control unit is low and the programming of the control unit simplified.

BRIEF DESCRIPTION OF THE DRAWINGS

Exemplary embodiments of the present application are explained in more detail below with reference to the accompanying drawings. Shown are.

DETAILED DESCRIPTION

Figure 1:
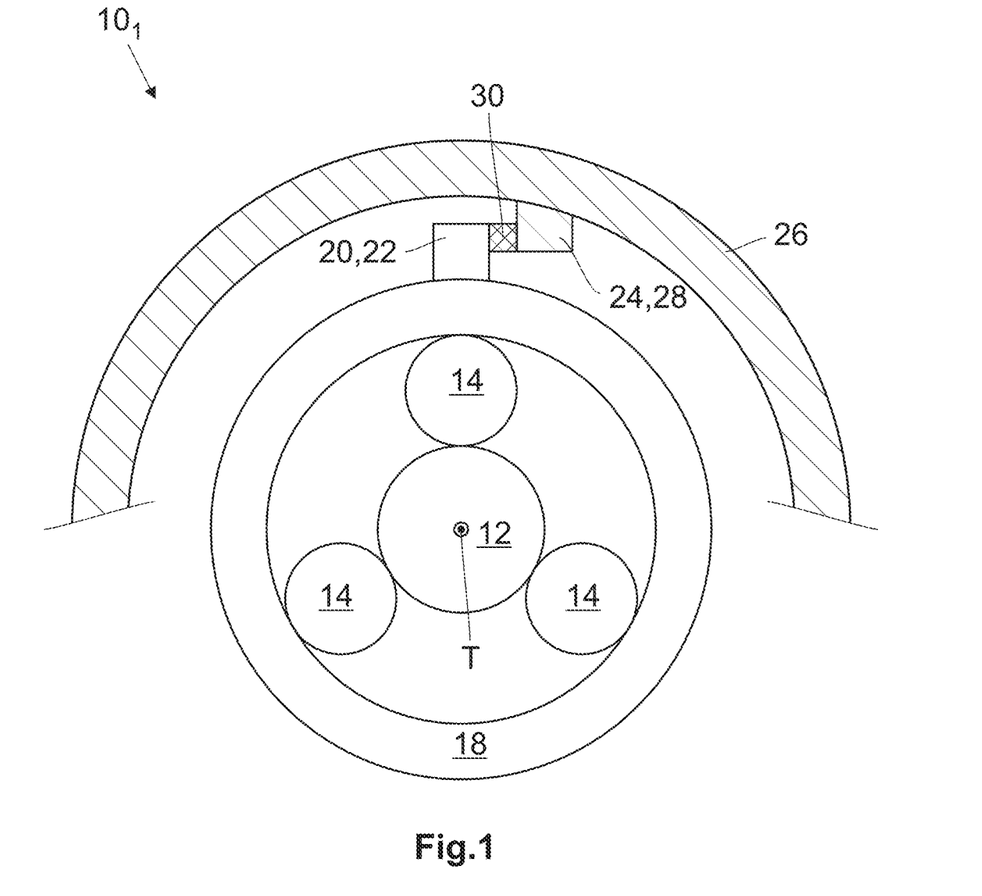
FIG. 1 a first exemplary embodiment of a planetary gear assembly according to the present application, FIG. 2a) a first exemplary embodiment of a force-sensing device according to the present application, FIG. 2b) a second exemplary embodiment of a force-sensing device according to the present application, FIG. 2c) a third exemplary embodiment of a force-sensing device according to the present application, FIG. 3 a second exemplary embodiment of a planetary gear assembly according to the present application, FIG. 4 a third exemplary embodiment of a planetary gear assembly according to the present application, FIG. 5 An embodiment of an electromechanical service brake according to the present application, and FIG. 6 a plan view of a motor vehicle equipped with two electromechanical service brakes and two electromechanical parking brakes, each based on schematic diagrams.

FIG. 1 shows a first exemplary embodiment of a planetary gear assembly $10_1$ according to the present disclosure as a schematic sectional drawing. The planetary gear assembly $10_1$ includes a sun gear 12, on which, in the shown example, three planet gears 14, which are rotatably mounted on a planet carrier 16, not shown in FIG. 1, (see FIGS. 3 and 4), roll off. Furthermore, the planetary gear assembly $10_1$ includes a ring gear 18, which is arranged concentrically with the sun gear 12 and encloses both the sun gear 12 and the planetary gears 14. The planetary gears 14 roll off the sun gear 12, as well as the ring gear 18. Both the sun gear 12, as well as the planetary gears 14 and the ring gear 18 have teeth, which are not shown here. The sun gear 12 and the planetary gears 14 each have external teeth, whereas the ring gear 18 has internal teeth.

The ring gear 18 is connected to an intermediate component 20, which, in this embodiment, is designed as a first projection 22, and protrudes radially outward from the ring gear 18. Alternatively, the first projection 22 may also be integrated directly into the ring gear 18, or the ring gear 18 may be provided with a recess, whereby no separate intermediate component 20 is needed.

Furthermore, the planetary gear assembly $10_1$ comprises a holding unit 24, which, in the illustrated exemplary embodiment, is formed as a second projection 26 attached to a housing 26, and protrudes radially inward. The first projection 22 and the second projection 28 overlap both in the axial direction along an axis of rotation T and in the radial direction relative to the axis of rotation T, thus forming an overlap area. In the overlap area between the intermediate component 20 and the holding unit 24, a force-sensing device 30 is arranged.

The planetary gear assembly $10_1$ may be operated, e.g., in the following manner: The sun gear 12 is rotated in a way not shown in more detail about the axis of rotation T perpendicular to the sectional plane of FIG. 1, with the result that the planetary gears 14 roll off the ring gear 18, due to the non-rotatably held holding unit 24. Thus, the planetary carrier 16, which is not shown, rotates about its own axis, which coincides with the axis of rotation T of the sun gear 12. Depending on how much torque is transferred at the planet carrier 16, the ring gear 18 must be non-rotatably held with more or less torque, also referred to as a holding torque, such that a corresponding force acts between the intermediate component 20 and the holding unit 24. Depending on the direction of rotation, a tensile or compressive force acts on the force-sensing device 30, which force has a fixed relation to the torque transferred from the planetary carrier 16. This tensile or compressive force is measured by the force-sensing device 30 in order to determine the transferred torque.

Figure 2A:
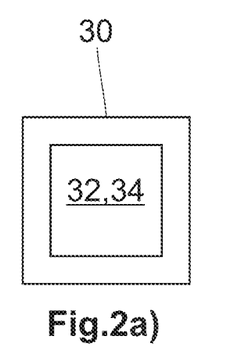

FIG. 2a) shows a first exemplary embodiment of the force-sensing device 30, which comprises a force transducer 32. The force transducer 32 may be configured as a spring body force transducer 34 and have a flexure beam, a ring-torsion spring, an S-shaped spring body, an expandable cylinder and/or a diaphragm spring body.

Figure 2B:
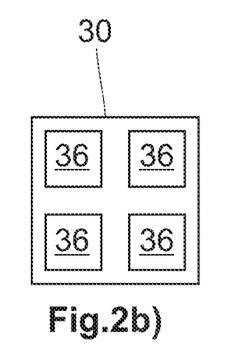

FIG. 2b) shows a second exemplary embodiment of the force-sensing device 30 according to the present disclosure, which has a total of four piezo-force transducers 36.

Figure 2C:
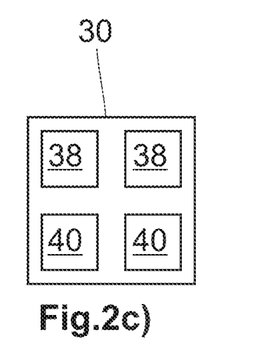

FIG. 2c) shows a third exemplary embodiment of a force-sensing device 30 according to the present disclosure based on a schematic diagram, and comprises a total of two electrical compensation force transducers 38 and two magnetostrictive elements 40.

Figure 3:
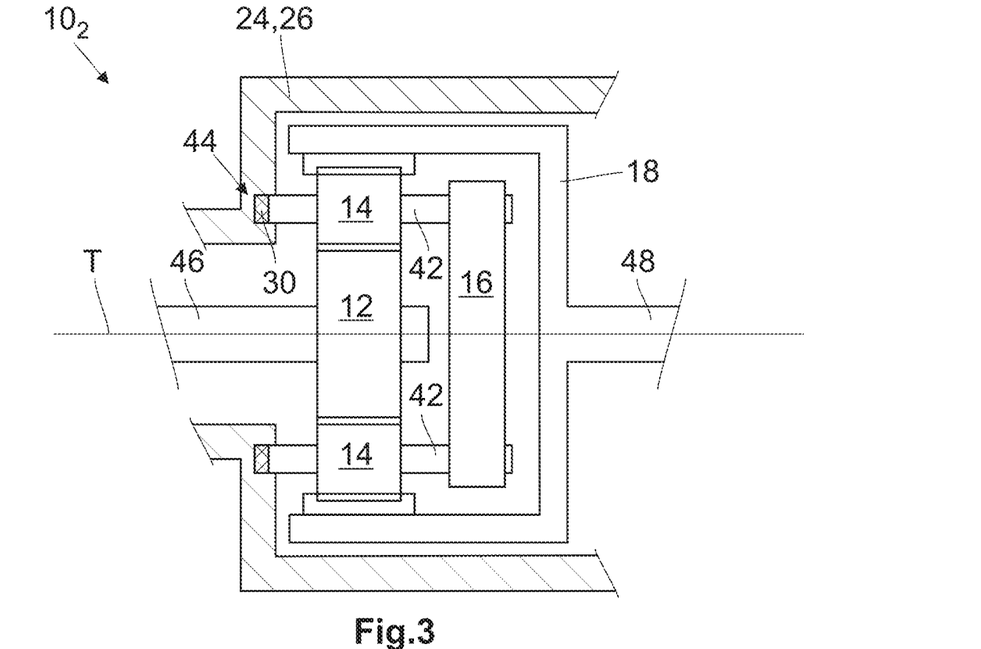

FIG. 3 shows a second exemplary embodiment of the planetary gear assembly 102 according to the present disclosure based on a schematic sectional view, wherein the axis of rotation T of the sun gear 12 extends in the sectional plane of FIG. 3. The structure is substantially similar to that of the first embodiment shown in FIG. 1. In contrast, however, here the planetary carrier 16 is non-rotatably held and represents the non-rotatably held element. The planetary carrier 16 has per planetary gear 14 one bearing pin 42 upon which, the planetary gears 14 are rotatably mounted. In the example shown, the bearing pins 42 engage in a relevant bore 44 of the housing 26 acting as the holding unit 24. Moreover, in the second exemplary embodiment, the holding unit 24 formed as the housing 26 and the bearing pin 42 of the non-rotatably held planetary carrier 16 overlap within an overlap area both in the radial and axial directions. The force-sensing device 30 is arranged between the bearing pin 42 and the wall of the bore 44. The force-sensing device 30 may annularly surround the bearing pin 42. Since the bearing pins 42 are part of each planetary carrier 16, no intermediate component 20 is needed in this exemplary embodiment in order to non-rotatably hold the planet carrier 16.

If the sun gear 12 is rotated via a drive shaft 46 about the axis of rotation T, the rotation of the sun gear 12 transfers to the planetary gears 14, which however can only rotate stationarily about the bearing pin 42 of the non-rotatably held planetary carrier 16, thereby causing rotation of the ring gear 18 about the axis of rotation T. The ring gear 18 is connected to an output shaft 48, from which a torque is transferred in a manner not shown more in detail.

The force-sensing device 30 measures the force acting between the bearing pin 42 and the bores 44. This force has a fixed relation to the torque transferred from the output shaft 48.

Figure 4:
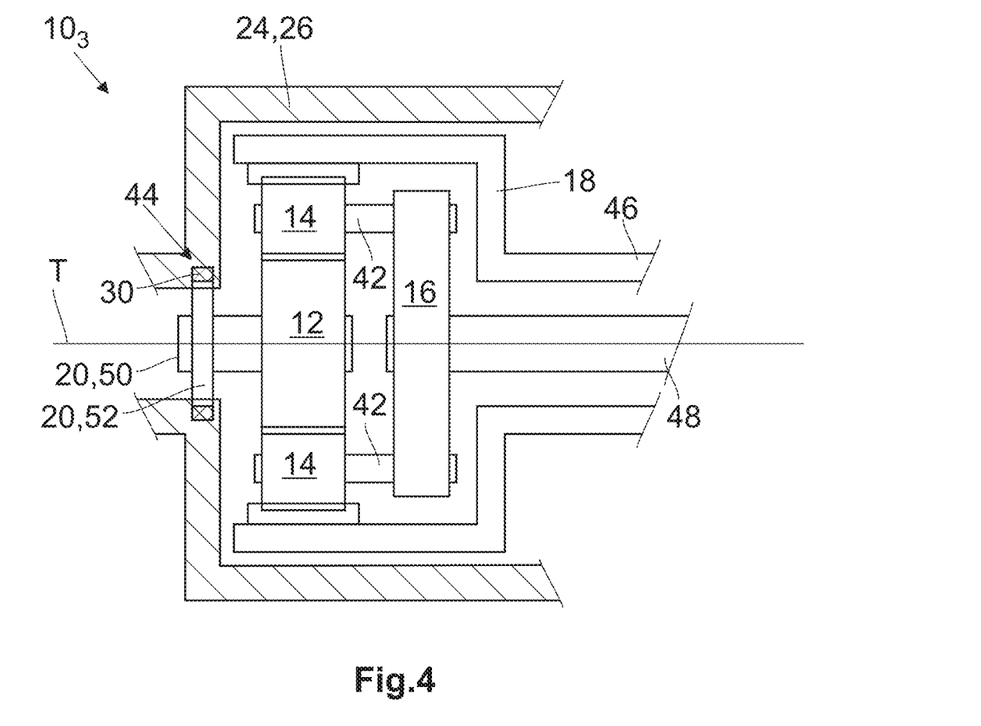

FIG. 4 shows a third exemplary embodiment of the planetary gear assembly $10_3$ according to the present disclosure, likewise in a sectional view. The structure is substantially similar to that of the first and the second exemplary embodiments, however, in this case, the sun gear 12 is non-rotatably held, which is why the intermediate component 20 comprises a shaft 50, which is non-rotatably connected to the sun gear 12, and a retaining pin 52 passing through the shaft 50. The retaining pin 52 engages in a bore 44 of the housing 26. Similar to the second exemplary embodiment, the force-sensing device 30 is arranged between the retaining pin 52 and the wall of the bore 44. The retaining pin 52 and the bore 44 overlap one another both radially and axially within an overlapping area.

For example, if the ring gear 18 is rotated, in a manner not shown in more detail, about the axis of rotation T by a drive shaft 46, which is implemented as a hollow shaft, this rotation is converted into a rotation of the planetary carrier 16, which is non-rotatably connected to the output shaft 48. The holding torque, which is required for holding the sun gear 12 in place and which can be determined by the force-sensing device 30, has a fixed relation to the torque transferred at the output shaft 48.

Figure 5:
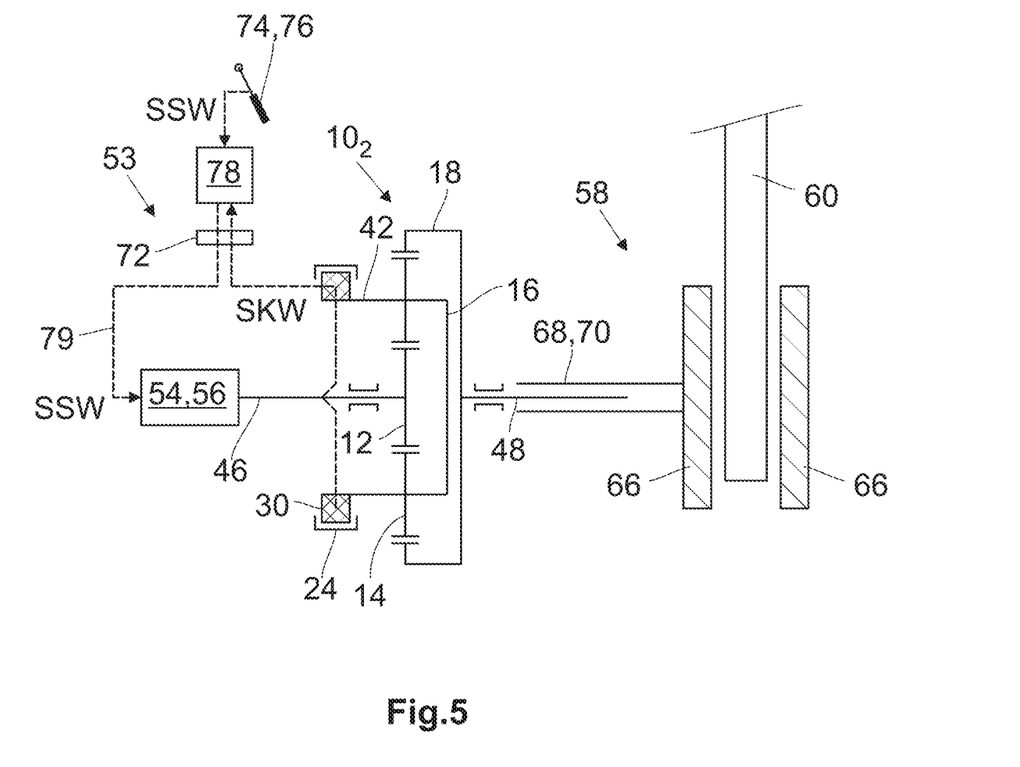
Figure 6:
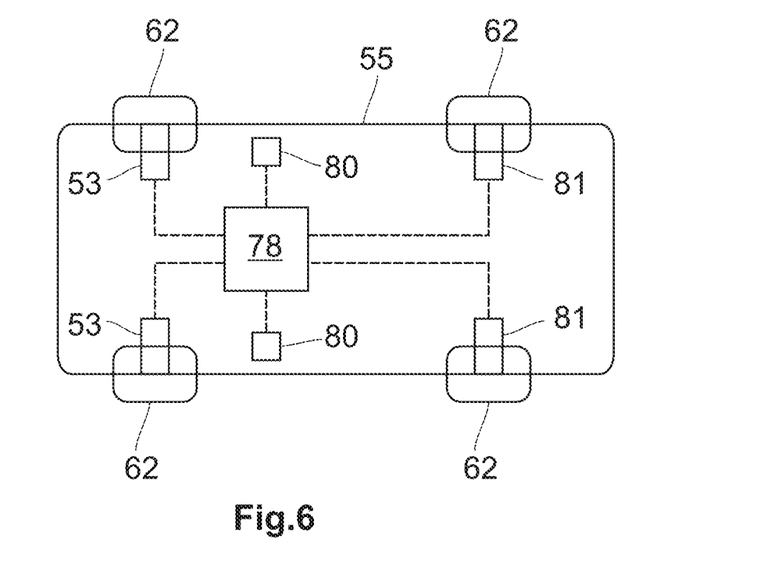

FIG. 5 shows a schematic diagram of an exemplary embodiment of an electromagnetic service brake 53 of a motor vehicle 55 (see FIG. 6). The electromagnetic service brake 53 has an electronic drive unit 54, which, in the illustrated exemplary embodiment, comprises an electric motor 56. The electric motor 56 outputs a torque via the drive shaft 46 to the sun gear 12 of the planetary gear assembly 102, which is designed according to the second exemplary embodiment (see FIG. 3). As mentioned above, the planetary carrier 16 is non-rotatably held by means of the holding unit 24, such that the rotation of the sun gear 12 causes the ring gear 18 to rotate. The rotation of the ring gear 18 is transmitted via the output shaft 48 to a brake unit 58 for decelerating the motor vehicle 55, which brake unit in this exemplary embodiment comprises a brake disc 60, which is non-rotatably connected to a not shown wheel 62 of the motor vehicle 55 (see FIG. 6). Furthermore, the brake unit 58 comprises two friction linings 66, which can be displaced axially, such that they contact the brake disc 60 and apply a braking force to the brake disc 60, whereupon the brake disc 60 and thus the wheel 62 of the motor vehicle 55 are decelerated. In order to convert the rotation of the ring gear 18 and the output shaft 48 non-rotatably connected to the ring gear 18 into a translational movement for axial adjustment of the friction linings 66, the brake unit 58 has a conversion device 68, which, in the shown example, is designed as a threaded spindle 70.

Furthermore, the electromechanical service brake 53 has an interface 72, with which it can be connected to a setpoint generator 74, which may typically comprise a brake pedal 76. Moreover, the electromechanical service brake 53 may be connected via the interface 72 to a control unit 78. Depending on the configuration, the control unit 78 and/or the setpoint generator 74 may be combined to form an electromechanical service brake system.

The electromechanical service brake 53 is operated in the following manner:

The driver of the motor vehicle 55 actuates the brake pedal 76 using a certain force, thereby providing a setpoint for the braking force in order for the brake unit 58 to decelerate the motor vehicle 55. The setpoint generator 74 generates a corresponding setpoint signal (SPS) and routes it via electrical lines 79 to the control unit 78. The control unit 78 controls the electric motor 56 accordingly, thus transmitting a corresponding torque to the drive shaft 46 and the sun gear 12. As mentioned above, the rotation of the sun gear 12 causes rotation of the ring gear 18 and the output shaft 48 connected thereto, which rotation is converted by the conversion device 68 into a translational movement, such that the friction linings 66 are thrust toward the brake disc 60 with a corresponding braking force. The braking force, which acts between the friction linings and the brake disc 60, determines the torque transferred from the output shaft 48 of the ring gear 18, which in turn determines the holding torque, with which the planet carrier 16 must be non-rotatably held. The holding torque determines the force acting between the holding unit 24 and the bearing pin 42 of the planetary carrier 16, and which is measured by the force-sensing device 30. The force-sensing device 30 generates a corresponding force value signal (FVS) and routes it via electrical lines 79 to the control unit 78. The control unit 78 can now convert the force value signal FVS to the actual value of the braking force acting in the brake unit 58 and compare it with the setpoint value of the braking force contained in the setpoint signal SPS and control the electric motor 56 correspondingly in the event of a deviation. If the actual value is less than the setpoint of the braking force, the control unit 78 causes the electric motor 56 to output a higher torque, whereas conversely, the control unit 78 causes the electric motor 56 to output a lower torque. The electromechanical service brake 53 according to the present disclosure is thus adjustable.

FIG. 6 shows a schematic plan view of a motor vehicle 55, which has a total of two electromechanical service brakes 53 according to the present disclosure and two electromechanical parking brakes 81, which are actuated via the same central control unit 78. As FIG. 6 shows only the schematic structure of the service brakes 53 and the parking brakes 81, no graphical distinction is made between them, even though their structure differs in detail.

Each of the electromechanical service brakes 53 and each of the electromechanical parking brakes 81 may be controlled or regulated independently of the other electromechanical service brake 53, such that safety systems, e.g., an anti-lock system or an electronic stability program, may be realized, whereby each wheel 62 is decelerated in a targeted manner. For this purpose, the motor vehicle 55 may include a number of sensors 80, which collect information about the driving status of the motor vehicle 55, convert it into corresponding signals and route it to the control unit 78. These sensors 80 may, for example, detect the rotational speed, the yaw rate of the motor vehicle 55, or the slip of the wheels 62. Depending on the driving status, the control unit 78 may independently cause deceleration of one or more of the wheels 62, without the driver pressing the brake pedal 76. In this case, the control unit 78 acts independently as a setpoint generator 74. Also, in the event that the motor vehicle 55 has been immobilized by means of the parking brake 81 and the force-sensing device registers a decrease in the braking force, e.g., due to cooling of the brake disc 60, the control unit 78 may increase (readjust) the setpoint, and thus ensure that the motor vehicle does not start rolling.

REFERENCE NUMERAL LIST

10, $10_1$-$10_3$ Planetary gear assemblies
12 Sun gear
14 Planetary gear
16 Planetary carrier
18 Ring gear
20 Intermediate component
22 First projection
24 Holding unit
26 Housing
28 Second projection
30 Force-sensing device
32 Force transducer
34 Spring body force transducer
36 Piezo-force transducer
38 Force transducer with electromagnetic compensation
40 Magnetostrictive element
42 Bearing pin
44 Bore
46 Drive shaft
48 Output shaft
50 Shaft
52 Retaining pin
53 Electromechanical service brake
54 Drive unit
55 Motor vehicle
56 Electric motor
58 Braking unit
60 Brake disc
62 Wheel
66 Friction lining
68 Conversion device
70 Threaded spindle
72 Interface
74 Setpoint generator
76 Brake pedal
78 Control unit
79 Electric line
80 Sensors
81 Electromechanical parking brake
FVS Force value signal (actual)
SPS Setpoint signal
T Axis of rotation

What is claimed:

1. A planetary gear assembly of a vehicle electromechanical brake, comprising:
   a central sun gear;
   a plurality of planetary gears rotatably supported on a planetary carrier;
   a ring gear enclosing the planetary gears, wherein the planetary gears are supported by the planetary carrier, such that the planetary gears can roll off both the sun gear and the ring gear, wherein the sun gear, the planetary carrier or the ring gear is non-rotatably held by a holding unit with a holding torque;
   an output shaft;
   a force-sensing device, wherein the force-sending device is arranged:
      between the holding unit and the sun gear, the planetary carrier or the ring gear that is held by the holding unit; or
      between the holding unit and an intermediate component which is non-rotatably connected to the sun gear, the planetary carrier or the ring gear that is held by the holding unit;
   wherein the force-sensing device measures a force acting between the sun gear, the planetary carrier or the ring gear that is held by the holding unit and the holding unit as a result of the holding torque; and
   whereby an applied force has a fixed relation to a torque delivered to the output shaft.

2. The planetary gear assembly according to claim 1, wherein the force-sensing device has a force transducer.

3. The planetary gear assembly according to claim 2, wherein the force transducer is a spring body force transducer.

4. The planetary gear arrangement according to claim 2, wherein the force-sensing device comprises a plurality of piezo-force transducers.

5. The planetary gear assembly according to claim 1, wherein the force-sensing device comprises a plurality of force transducers with electromagnetic compensation.

6. The planetary gear assembly according to claim 1, wherein the force-sensing device comprises a plurality of magnetostrictive elements.

7. The planetary gear assembly according to claim 1, wherein the planetary gear assembly comprises a housing, and the holding unit is formed by the housing.

8. The planetary gear assembly according to claim 1, further comprising:
   an electronic drive unit operatively coupled to a vehicle service brake;
   a braking unit actuated by the drive unit by using the planetary gear assembly; and
   wherein the force-sensing device generates a force value signal that corresponds to the measured force acting between the holding unit and the sun gear, the planetary carrier or the ring gear that is held by the holding unit and the holding unit.

9. The planetary gear assembly according to claim 8, further comprising:
   a motor vehicle operatively coupled to the vehicle service brake.

10. The planetary gear assembly according to claim 9, further comprising:
    a setpoint generator that establishes a setpoint braking force at which a brake unit decelerates the motor vehicle, wherein the setpoint generator generates a corresponding setpoint signal; and
    a control unit, which receives the force value signal and the setpoint signal, calculates an actual value of the braking force acting in the brake unit based on the force value signal and compares it with the setpoint braking force, and controls the electronic drive unit according to the comparison.

11. The planetary gear assembly according to claim 10, further comprising:
    a motor vehicle operatively coupled to the vehicle parking brake.

12. The planetary gear assembly according to claim 11, further comprising:
    a setpoint generator that establishes a setpoint braking force at which a brake unit decelerates the motor vehicle, wherein the setpoint generator generates a corresponding setpoint signal; and
    a control unit, which receives the force value signal and the setpoint signal, calculates an actual value of the braking force acting in the brake unit based on the force value signal and compares it with the setpoint braking force, and controls the electronic drive unit according to the comparison.

13. The planetary gear assembly according to claim 1, further comprising:
    an electronic drive unit operatively coupled to a motor vehicle parking brake;
    a braking unit actuated by the drive unit by using the planetary gear assembly; and
    wherein the force-sensing device generates a force value signal that corresponds to the measured force acting between the holding unit and the sun gear, the planetary carrier or the ring gear that is held by the holding unit and the holding unit.

14. A method for operating a motor vehicle electromechanical brake comprising:
    providing an electromechanical brake comprising:
       an electronic drive unit;
       a planetary gear as sembly_drivable by the drive unit;
       a braking unit actuated by the electronic drive unit by using the planetary gear assembly;
    providing a setpoint generator, with which a setpoint for a braking force, with which the braking unit decelerates the motor vehicle, wherein the set point generator generates the set point signal;
    providing a control unit, wherein the control unit:
       generates a force value signal corresponding to a force acting between a held element and a planetary gear assembly holding unit by using the force-sensing device;
       calculating the actual value of the brake force acting in the brake unit based on the force value signal;
       receives the setpoint signal;
       compares the actual value with the setpoint; and
       actuates the electronic drive unit based on the comparison of the actual value with the setpoint.

* * * * *